Feb. 9, 1960 T. E. LEWIS 2,924,492

PIVOTED ANTI-FRICTION BEARING

Filed June 24, 1959

INVENTOR.
THOMAS E. LEWIS
BY Donald G. Dalton

ATTORNEY 2,924,492

PIVOTED ANTI-FRICTION BEARING

Thomas E. Lewis, Johnstown, Pa., assignor to United States Steel Corporation, a corporation of New Jersey Application June 24, 1959, Serial No. 822,554

2 Claims. (Cl. 308—226)

The present invention relates generally to anti-friction devices and more particularly has as its primary object the provision of an improved anti-friction bearing especially suitable as a side bearing for railroad car trucks and the like.

It is another object of the invention to provide an anti-friction bearing having multiple anti-friction rollers journaled in a rotatable yoke whereby the rollers are permitted to revolve in a vertical plane and the yoke in a horizontal plane to maintain a true alignment or track with the arc through which the truck of a railroad car swings during movement of the car.

It is a further object of the invention to provide a device of the character indicated wherein the multiple anti-friction rollers are journaled on a common shaft and each can revolve at a different speed relative to the others in response to a speed differential along the radius of the arc through which the body supported travels.

These and other objects will become more apparent after referring to the following specification and attached drawings, in which.

Figure 1:
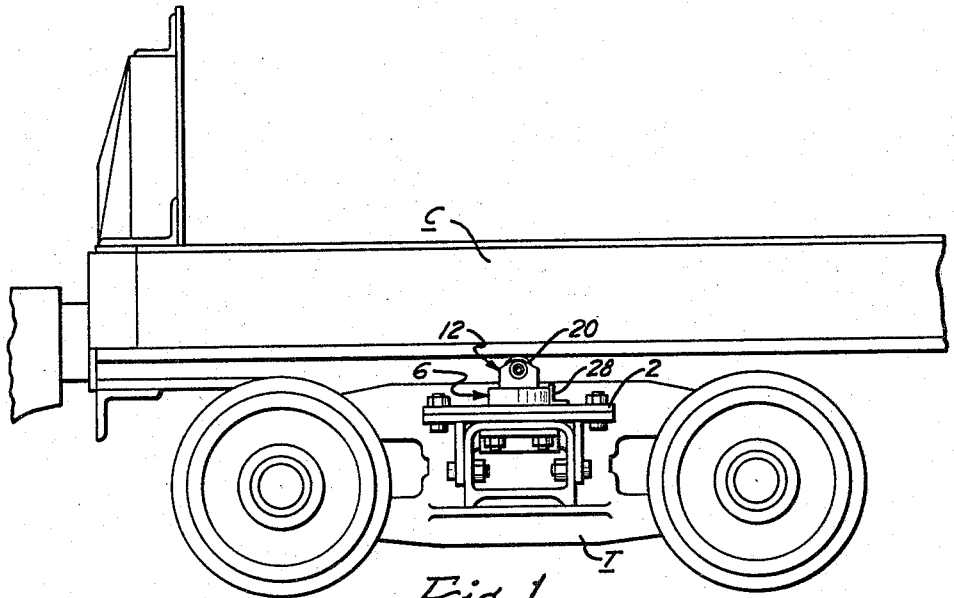
Figure 1 is a partial side elevational view of a railroad car having the anti-friction bearing of the invention installed thereon.
Figure 2:
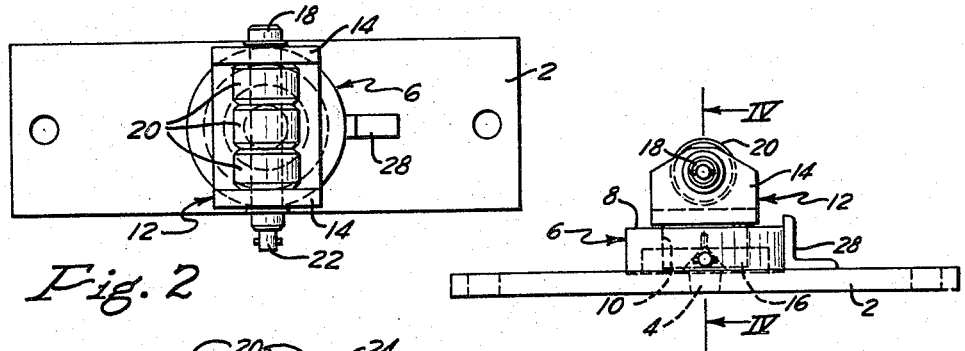
Figure 2 is a plan view of the anti-friction bearing of the invention.
Figure 3:
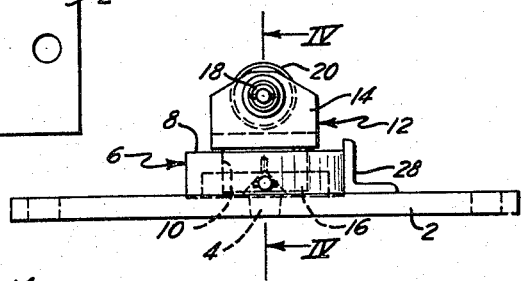
Figure 3 is a side elevational view of Figure 2.
Figure 4:
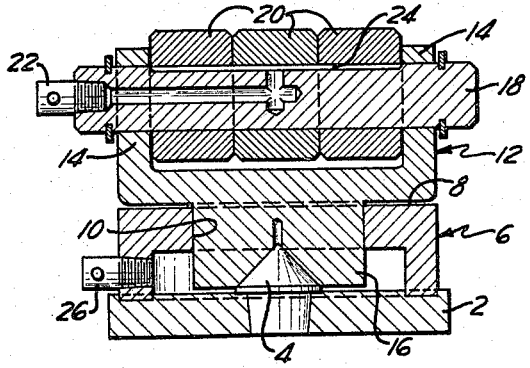
Figure 4 is an enlarged sectional view taken along the line IV—IV of Figure 3.

Referring more particularly to the drawings reference character T designates a truck of a railroad car C having the anti-friction bearing of the invention installed thereon.

The anti-friction bearing of the invention includes a base plate 2 having a cone-shape pivot pin 4 projecting upwardly therefrom. A bearing pedestal 6 having a flat top 8 and a vertical opening 10 through the top is rigidly mounted, by welding or otherwise, on the base plate 2 with the opening 10 concentric with the pivot pin 4.

A cradle yoke 12 having spaced apertured upstanding lugs 14 and a depending shank 16 is mounted on the bearing pedestal with its shank 16 journaled in the opening 10 and bearing on the pivot pin 4. Preferably, there is clearance between the yoke and the flat top of the bearing pedestal so that the yoke may rotate freely. A shaft 18 is journaled in the upstanding lugs 14 and carries three anti-friction rollers 20 journaled thereon between the lugs. Although I have shown three anti-friction rollers journaled on shaft 18 it will be noted that this number may vary from two to any number more than two as desired.

A lubricant fitting 22 communicating with a lubricant groove 24 may be provided in the shaft 18 for supplying lubricant to the rollers 20. A lubricant fitting 26 may also be provided in the wall of the bearing pedestal 6 for introducing lubricant to the interior of the pedestal. It is preferable to pack the interior of the pedestal with grease through fitting 26 so as to provide long lasting lubrication and also provide means in addition to pivot pin 4 for supporting the shank 16 of the yoke 12.

A stop 28 in form of an angle member is rigidly attached by welding or similar means on the base 2 and the outer wall of the pedestal 6 and extends upwardly along the outer wall of the pedestal. The angle member projects above the top of the pedestal into the path of the yoke 12, whose length is slightly greater than the diameter of the pedestal, to limit the rotation of the yoke. The stop 28 may be omitted if desired to allow the yoke to rotate freely about 360 degrees.

It will be evident from the foregoing that the invention provides a ruggedly constructed anti-friction bearing which aligns itself automatically in accordance with the arc of travel of a body supported and also is self-adjusting insofar as the relative speeds of revolution of its anti-friction rollers.

Although I have shown the anti-friction bearing of the invention as used on railroad car trucks it is obvious that it can be used to advantage in other installations such as turntables, conveyors, etc.

While one embodiment of my invention has been shown and described, it will be apparent that other adaptations and modifications may be made without departing from the scope of the following claims.

I claim:

1. An anti-friction bearing comprising a base having a pivot pin projecting upwardly therefrom, a hollow bearing pedestal on said base, said pedestal having a flat top and a vertical bore through said top concentric with said pivot pin, a yoke having a shank journaled in said bore and bearing on said pivot pin, said yoke having spaced upstanding lugs, a shaft extending through said lugs, and a plurality of anti-friction rollers journaled on said shaft.

2. An anti-friction bearing as defined by claim 1 including a stop on said bearing pedestal projecting above the top thereof in the path of said yoke for limiting the rotation of said yoke.

References Cited in the file of this patent

UNITED STATES PATENTS

| | | |
|---|---|---|
| 675,977 | Rogers | June 11, 1901 |
| 1,153,792 | Johnson | Sept. 14, 1915 |
| 2,865,690 | Risse | Dec. 23, 1958 |